N. B. COON.
TROLLEY.
APPLICATION FILED JAN. 4, 1912.
1,036,457.
Patented Aug. 20, 1912.
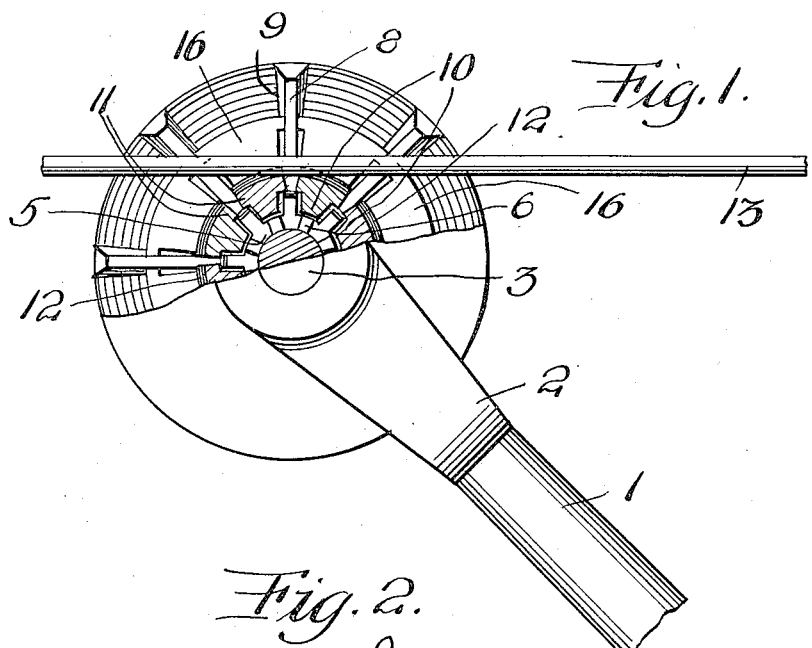
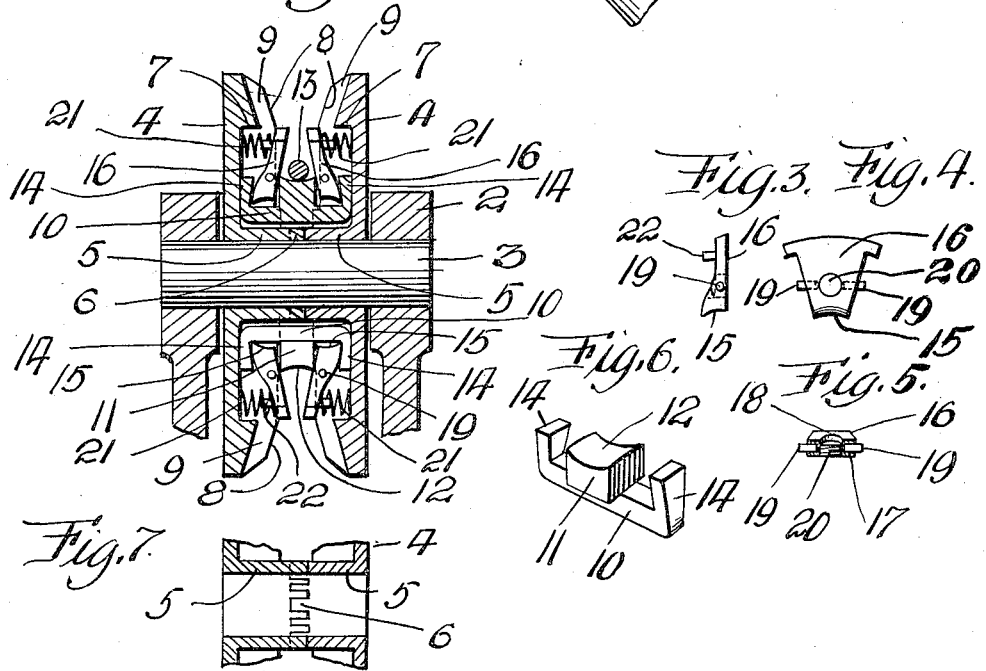
WITNESSES
INVENTOR
N. B. Coon.
BY
ATTORNEYS

UNITED STATES PATENT OFFICE.

NELSON B. COON, OF NORTH BRADDOCK, PENNSYLVANIA.

TROLLEY.

1,036,457.  Specification of Letters Patent.  Patented Aug. 20, 1912.

Application filed January 4, 1912. Serial No. 669,398.

*To all whom it may concern:*

Be it known that I, NELSON B. COON, a citizen of the United States of America, residing at North Braddock, in the county of Allegheny and State of Pennsylvania, have invented certain new and useful Improvements in Trolleys, of which the following is a specification, reference being had therein to the accompanying drawing.

This invention relates to trolleys, and the objects of my invention are to provide a novel trolley wheel that will remain in engagement with a trolley wire, rail or electric conductor under the most exacting circumstances, and to furnish a trolley wheel with renewable wearing members for the trolley wire.

Other objects of my invention are to provide a trolley wheel that can be advantageously used in connection with high speed suburban trolley systems, especially cars equipped with electric brakes that depend for operation upon the current received from a trolley wire, and to provide a trolley wheel that will prevent accidental displacement of a trolley wire without interfering with trolley hangers, frogs, guard rails or other overhead construction of an electric trolley system.

Further objects of my invention are to provide a sectional trolley wheel having novel yieldable gripping members that ride into and out of engagement with a trolley wire, but always bridge the wire in a manner that prevents its displacement, and to accomplish the above results by a mechanical construction that is durable, inexpensive to manufacture and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 1 is a side elevation of a trolley wheel in accordance with this invention, partly broken away and partly in section, Fig. 2 is a vertical sectional view of the trolley wheel, Fig. 3 is a front elevation of a detached gripping member, Fig. 4 is a side elevation of the same, Fig. 5 is a horizontal sectional view of the gripping member, Fig. 6 is a perspective view of a detached wearing member, and Fig. 7 is a detail sectional view of a portion of the wheel.

The reference numeral 1 denotes a portion of a pole having a harp 2 provided with a transverse journal pin 3. Revolubly mounted upon the pin 3 are circular sections 4 forming the body of the trolley wheel. The sections 4 have cylindrical confronting hub portions 5 provided with interlocking tongues 6 whereby the sections 4 will revolve in unison upon the journal pin 3. The inner sides of the sections 4 are provided with radially disposed pockets 7 forming radially disposed ribs 8 that have the sides thereof beveled, as at 9.

Arranged within the inner ends of the pockets 7 are transverse wearing members 10 having central wearing blocks 11 provided with concave faces 12 engaged by a trolley wire 13. The ends of the members 10 are bent, as at 14 within the pockets 7 and extending into the members 10, between the blocks 11 and the ends 14 thereof, are the inner enlarged ends 15 of segment-shaped gripping members 16. Each member 16 has a longitudinal opening 17 intersecting a transverse opening 18 that has the walls thereof screw threaded.

Arranged within the longitudinal openings 17 are trunnions 19 and the inner ends of said trunnions are beveled to be engaged and separated by a screw or plug 20 screwed into the opening 18. The trunnions 19 are adapted to enter sockets provided therefor in the ribs 8 and after the trunnions have been separated, as shown in Figs. 4 and 5, the gripping members 16 are pivotally supported within the outer ends of the pockets 7.

Interposed between the sections 4 and the outer ends of the members 16 are coiled compression springs 21, these springs being arranged within the pockets 7 and encircling pins 22, carried by the gripping members 16.

In operation, a pair or set of the gripping members 16 are always extending above the trolley wire 13 and with the wheel rapidly revolving, the wire 13 is continuously bridged by the gripping members which act to retain the wire 13 in engagement with the trolley, due to the fact that the gripping members are forced toward each other by the springs 21, and as the wheel rapidly revolves the action of the wire is not solely upon one set of gripping members, but acts successively on all of the gripping members and by this arrangement before one set of gripping members can be forced open, the other set of gripping members passes into engagement with the wire 13, and it is this action which tends to maintain the trolley wire 13 upon the trolley wheel.

While in the drawing there is illustrated a preferred embodiment of the invention, it is to be understood that the structural elements thereof are susceptible to such variations and modifications as fall within the scope of the appended claims.

What I claim is:—

1. A trolley wheel comprising circular sections having interlocking hub portions, said sections having the inner sides thereof provided with pockets, transverse wearing members arranged in the inner ends of said pockets and adapted to engage a trolley wire, and pivoted gripping members arranged in the pockets of said sections and having the inner ends thereof extending into said wearing members.

2. A trolley wheel comprising sections having interlocking hub sections, said sections having the inner sides thereof provided with pockets, transversely arranged wearing members mounted in the inner ends of said pockets and provided with wearing blocks adapted to receive a trolley wire, and spring pressed gripping members pivotally mounted in the pockets of said sections and having the inner ends thereof extending into said wearing members.

3. A trolley wheel comprising circular sections having the inner sides thereof provided with pockets, wearing members having the ends thereof extending into the inner ends of said pockets, spring pressed gripping members trunnioned within the pockets of said sections, each member having shiftable trunnions, and means for locking said trunnions in a shifted position.

In testimony whereof I affix my signature in the presence of two witnesses.

NELSON B. COON.

Witnesses:
MAX H. SROLOVITZ,
CHRISTINA T. HOOD.

---

Copies of this patent may be obtained for five cents each, by addressing the "Commissioner of Patents, Washington, D. C."